US012564913B2

(12) United States Patent
Kaihara

(10) Patent No.: US 12,564,913 B2
(45) Date of Patent: Mar. 3, 2026

(54) MEASURING DEVICE AND PROGRAM

(71) Applicant: FANUC CORPORATION, Yamanashi (JP)

(72) Inventor: Kenji Kaihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 317 days.

(21) Appl. No.: 18/260,731

(22) PCT Filed: Apr. 9, 2021

(86) PCT No.: PCT/JP2021/015010
§ 371 (c)(1),
(2) Date: Jul. 7, 2023

(87) PCT Pub. No.: WO2022/215247
PCT Pub. Date: Oct. 13, 2022

(65) Prior Publication Data
US 2024/0066654 A1 Feb. 29, 2024

(51) Int. Cl.
*B23Q 17/22* (2006.01)
*B23Q 17/09* (2006.01)
(Continued)

(52) U.S. Cl.
CPC ..... *B23Q 17/2233* (2013.01); *B23Q 17/0914* (2013.01); *B23Q 17/0923* (2013.01);
(Continued)

(58) Field of Classification Search
CPC ............ B23Q 17/2233; B23Q 17/0914; B23Q 17/0923; B23Q 17/2241; G01B 5/043;
(Continued)

(56) References Cited

U.S. PATENT DOCUMENTS 10,401,162 B2 * 9/2019 Lummes .............. G05B 19/401
2012/0065769 A1 * 3/2012 Knaupp .................... B24C 9/00
700/193
(Continued)

FOREIGN PATENT DOCUMENTS

JP       S60-062446 A       4/1985
JP       H03-228551 A      10/1991
(Continued)

OTHER PUBLICATIONS

International Search Report issued in PCT/JP2021/015010; mailed Jun. 22, 2021.

*Primary Examiner* — Ryan D Walsh
(74) *Attorney, Agent, or Firm* — Studebaker Brackett PLLC

(57) ABSTRACT

Provided is a measuring device which, with respect to a measuring instrument for measuring the length of a cutting tool, measures the distance from a reference position of a machine tool to a tool detection position of the measuring instrument. The measuring device comprises: a movement control unit for controlling movement of a standard tool attached to the machine tool; a detection unit for detecting a detection signal indicating a tool detection position output by pressing-down of the measuring instrument; and an identification unit for identifying the tool detection position of the measuring instrument, on the basis of the position of the tip of the standard tool at the timing of detecting the detection signal. The detection unit detects the detection signal indicating that the tip of the standard tool is present within a tool detectable range including the tool detection position. The movement control unit moves the standard tool in a direction away from the measuring instrument to change the state in which the detection signal is detectable by the detection unit to a state in which the detection signal is not detectable by the detection unit, and then moves the standard (Continued)

tool toward the measuring instrument to change the state to a state in which the detection signal is detectable again by the detection unit. The identification unit identifies the tool detection position, on the basis of the position of the standard tool at the timing of detecting the detection signal again.

5 Claims, 5 Drawing Sheets

(51) Int. Cl.
| | | |
|---|---|---|
| *G01B 5/04* | (2006.01) | |
| *G01B 5/14* | (2006.01) | |
| *G05B 19/401* | (2006.01) | |

(52) U.S. Cl.
CPC ......... *B23Q 17/2241* (2013.01); *G01B 5/043* (2013.01); *G01B 5/14* (2013.01); *G05B 19/401* (2013.01); *G05B 2219/37383* (2013.01)

(58) Field of Classification Search
CPC .................... G01B 5/14; G05B 19/401; G05B 2219/37383
See application file for complete search history.

(56) References Cited

U.S. PATENT DOCUMENTS

| | | | | |
|---|---|---|---|---|
| 2023/0158624 A1* | 5/2023 | Uenishi | ................. | B23Q 17/22 |
| | | | | 700/159 |
| 2024/0058916 A1* | 2/2024 | Kaihara | ............. | B23Q 17/0914 |

FOREIGN PATENT DOCUMENTS

| | | | |
|---|---|---|---|
| JP | H11-099450 A | 4/1999 | |
| JP | H11-138392 A | 5/1999 | |
| JP | 2002-120130 A | 4/2002 | |
| JP | 2004-276212 A | 10/2004 | |

* cited by examiner

MEASURING DEVICE AND PROGRAM

TECHNICAL FIELD

The present invention relates to a measuring device and a program.

BACKGROUND ART

Conventionally, a numerical control device that controls a machine tool or the like executes machining or the like of a workpiece according to a machining program. In such cases, it is desirable to precisely correct the position coordinates of a tool tip to calibrate a mechanical error of a tool (e.g., cutting tool) attached to a machine tool in order to achieve precise machining of a workpiece. Therefore, a device has been proposed to identify the coordinates of a tool tip in actual machining (for example, see Patent Documents 1 and 2).

Patent Document 1: Japanese Unexamined Patent Application, Publication No. H11-138392
Patent Document 2: Japanese Unexamined Patent Application, Publication No. H11-99450

DISCLOSURE OF THE INVENTION

Problems to be Solved by the Invention

When the coordinates of a tool tip are identified, for example, a measuring instrument disposed on a table of a machine tool is used. The measuring instrument can detect pressing down of a pressed surface to a tool detection position by the tool tip. The measuring instrument is configured to be able to transmit a detection signal to a numerical control device in response to the pressing down to the tool detection position. The numerical control device measures the tool length of the tool based on the feed position of the tool at the timing of receiving the detection signal.

Incidentally, since the measuring instrument is disposed on the table of the machine tool, the measuring instrument may be exposed to a cutting fluid and cutting dust during workpiece machining. Therefore, it is desirable to be able to verify whether the measuring instrument operates appropriately when identifying the tool detection position.

Means for Solving the Problems

The present disclosure relates to a measuring device for measuring, with respect to a measuring instrument for measuring a length of a cutting tool attached to a machine tool, a distance from a reference position of the machine tool to a tool detection position of the measuring instrument. The measuring device includes a movement control unit configured to control movement of a standard tool having a known length attached to the machine tool, a detection unit configured to detect a detection signal indicating the tool detection position, output by pressing down of the measuring instrument, and an identification unit configured to identify the tool detection position of the measuring instrument based on a position of a tip of the standard tool at a timing when the detection signal is detected. The detection unit is configured to detect the detection signal indicating that the tip of the standard tool exists within a tool detectable range including the tool detection position. The movement control unit is configured to move the standard tool in a direction away from the measuring instrument to change a state in which the detection signal is detected by the detection unit to a state in which the detection signal is not detected by the detection unit, and then move the standard tool toward the measuring instrument to change to a state in which the detection signal is detected again by the detection unit. The identification unit is configured to identify the tool detection position based on a position of the standard tool at a timing when the detection signal is detected again.

Furthermore, the present disclosure relates to a program causing a computer to function as a measuring device for measuring, with respect to a measuring instrument for measuring a length of a cutting tool attached to a machine tool, a distance from a reference position of the machine tool to a tool detection position of the measuring instrument. The program causes the computer to function as: a movement control unit configured to control movement of a standard tool having a known length attached to the machine tool, a detection unit configured to detect a detection signal indicating the tool detection position, output by pressing down of the measuring instrument, and an identification unit configured to identify the tool detection position of the measuring instrument based on a position of a tip of the standard tool at a timing when the detection signal is detected. The detection unit is configured to detect the detection signal indicating that the tip of the standard tool exists within a tool detectable range including the tool detection position. The movement control unit is configured to move the standard tool in a direction away from the measuring instrument to change a state in which the detection signal is detected by the detection unit to a state in which the detection signal is not detected by the detection unit, and then move the standard tool toward the measuring instrument to change to a state in which the detection signal is detected again by the detection unit. The identification unit is configured to identify the tool detection position based on a position of the standard tool at a timing when the detection signal is detected again.

Effects of the Invention

According to the present disclosure, it is possible to provide a measuring device and a program capable of verifying whether a measuring instrument operates appropriately.

PREFERRED MODE FOR CARRYING OUT
THE INVENTION

Hereinafter, a measuring device 1 according to an embodiment of the present disclosure will be described with reference to FIGS. 1 to 4. First, before describing the measuring device 1 according to the embodiment, a machine tool 2 connected to the measuring device 1 will be described.

Figure 1:
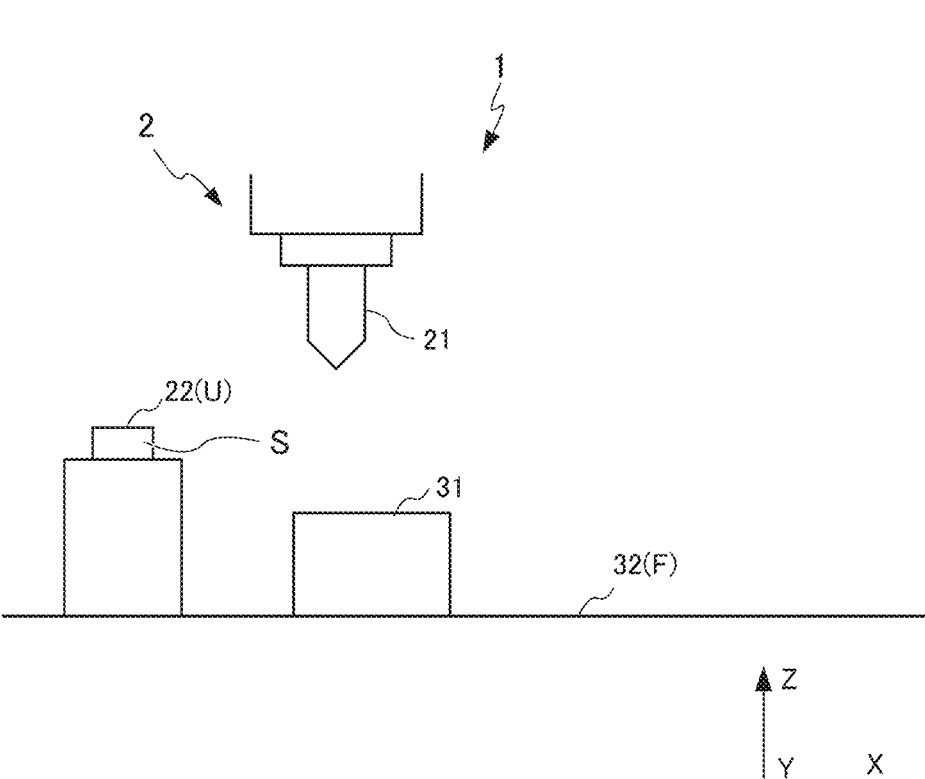
FIG. 1 shows an outline of a machine tool in a measuring device according to an embodiment of the present disclosure.

The machine tool 2 can machine a workpiece 31 using a cutting tool 21, for example, as shown in FIG. 1. Specifically, the machine tool 2 can machine the workpiece 31 conveyed on a table 32 using the cutting tool 21. The machine tool 2 machines the workpiece 31 by bringing the tip of the cutting tool 21 attached to a tool holder (not shown) into contact with the workpiece 31. The machine tool 2 includes a measuring instrument 22.

The measuring instrument 22 is used to measure the length (tool length) of the cutting tool 21 attached to the machine tool 2. The measuring instrument 22 is used, for example, to measure the actual length of the cutting tool 21 in which wear or the like occurs due to machining of the workpiece 31. As an example, the measuring instrument 22 is used to measure the actual length of the cutting tool 21 in advance before cutting the workpiece 31. The measuring instrument 22 detects pressing down by the cutting tool 21. The measuring instrument 22 outputs a signal in response to detection of pressing down.

The measuring instrument 22 is disposed, for example, on a top surface (hereinafter, also referred to as a reference position F; the top surface of the table 32 is an example of the reference position F) of the table 32. The measuring instrument 22 has a predetermined height. The measuring instrument 22 includes a switch S pressed down by the tip of the cutting tool 21, in an upper portion including a pressed surface U (top surface). Although the pressed surface U is generally an upper surface in a vertical direction, the pressed surface U may face a side other than the vertically upper side, depending on the installation direction of the measuring instrument 22. When the switch S is pressed down to a predetermined position, the measuring instrument 22 outputs a signal indicating that the pressing down is detected at the predetermined position. That is, when the switch S is pressed down to a tool detection position P (see FIG. 3D) provided at a predetermined position to which the pressed surface U is pressed down, the measuring instrument 22 outputs a signal indicating the pressing down by the cutting tool 21 or a standard tool 23.

Next, an outline of the measuring device 1 will be described. The measuring device 1 is configured, for example, as a part of a numerical control device. The measuring device 1 controls the operation of the cutting tool 21 with respect to the machine tool 2. Furthermore, the measuring device 1 measures the tool length of the cutting tool 21 by acquiring a signal from the measuring instrument 22.

In the following embodiment, the measuring device 1 identifies the tool detection position P set in the measuring instrument 22 prior to measuring the tool length of the cutting tool 21. For example, the measuring device 1 uses the standard tool 23 having a known length instead of the cutting tool 21 to identify the tool detection position P. In particular, the measuring device 1 identifies the tool detection position P depending on the feed speed of the cutting tool 21 set in advance by the user of the machine tool 2 or the like. The measuring device 1 can measure the distance from the reference position F of the machine tool 2 to the tool detection position P of the measuring instrument 22.

Thus, the measuring device 1 optimizes the tool detection position P depending on the feed speed set by the user or the like with respect to the detection of the tool detection position P accompanied by the mechanical operation of the measuring instrument 22. Therefore, the accuracy of measuring the length of the cutting tool 21 can be improved.

Further, in the following embodiment, the tool detection position P is identified while verifying whether the measuring instrument 22 operates. Thus, the measuring instrument 22 and the standard tool 23 can be protected.

Figure 2:
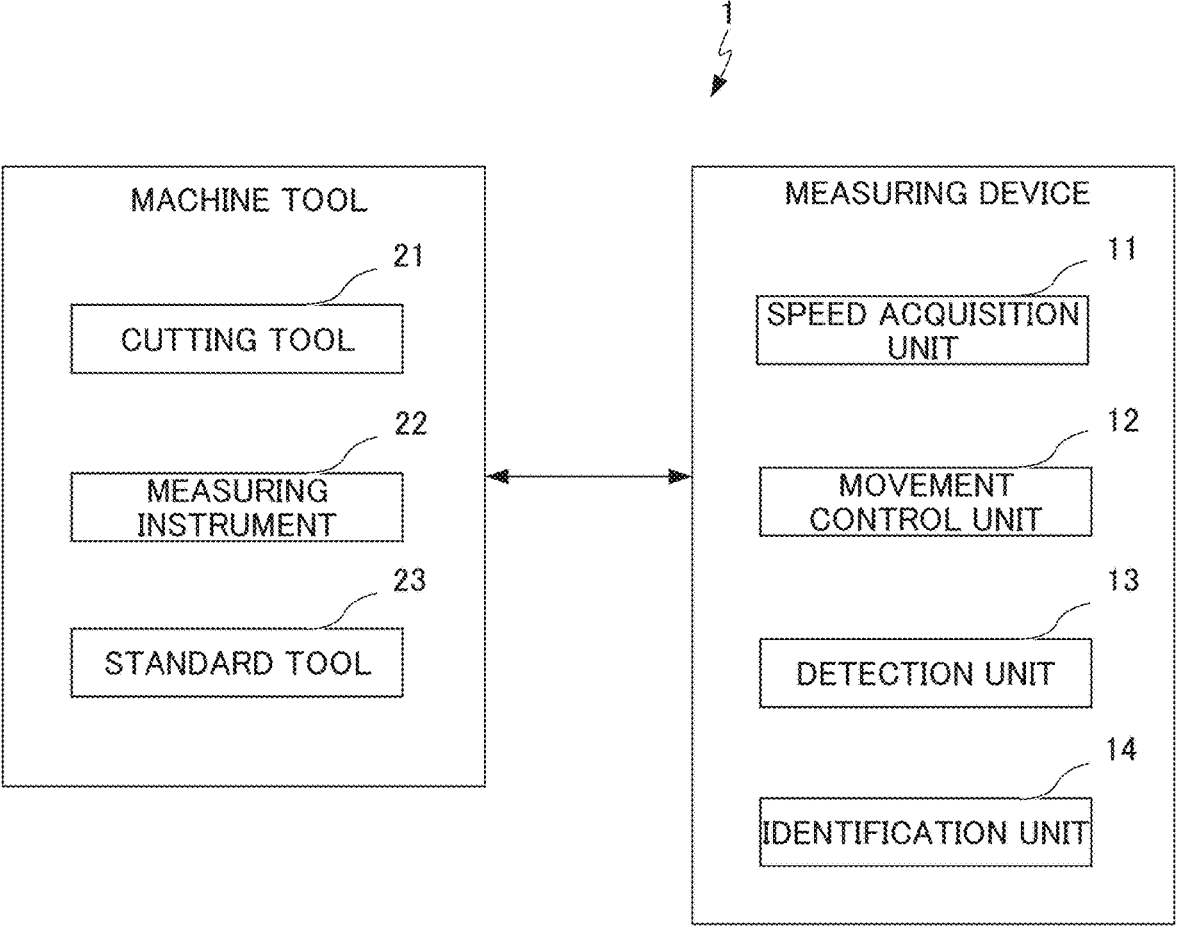
FIG. 2 shows a configuration of the measuring device of the embodiment.

Next, a measuring device 1 and a program according to an embodiment of the present disclosure will be described with reference to FIGS. 1 to 4. As shown in FIG. 2, the measuring device 1 is configured to be communicable with a machine tool 2. The measuring device 1 includes a speed acquisition unit 11, a movement control unit 12, a detection unit 13, and an identification unit 14.

The speed acquisition unit 11 is implemented, for example, by a CPU operating. The speed acquisition unit 11 acquires a preset feed speed at which a cutting tool 21 is moved toward a measuring instrument 22 when the length of the cutting tool 21 is measured. The speed acquisition unit 11 acquires, for example, a feed speed that is preset when the tool length of the cutting tool 21 is measured, and at which the cutting tool 21 is moved from a position above the measuring instrument 22 toward the measuring instrument 22. The speed acquisition unit 11 acquires the feed speed of the cutting tool 21, for example, by reading the feed speed from a program storage unit (not shown) for storing the feed speed of the cutting tool 21 when the tool length is measured.

The movement control unit 12 is implemented, for example, by the CPU operating. The movement control unit 12 controls, for example, the movement of a standard tool 23 having a known length attached to the machine tool 2. The movement control unit 12 moves the tip of the standard tool 23 having a known length attached to the machine tool 2 toward the measuring instrument 22 in the axial direction, for example. The movement control unit 12 moves the standard tool 23 at a feed speed acquired by the speed acquisition unit 11, thereby causing the standard tool 23 to press down a pressed surface U of the measuring instrument 22. The movement control unit 12 moves the tip of the standard tool 23 having a known length attached to the machine tool 2 toward the pressed surface U of the measuring instrument 22 in the axial direction (movement direction D), for example. The movement control unit 12 moves the tip of the standard tool 23 toward the tool detection position P of the measuring instrument 22 while pressing and moving the pressed surface U of the measuring instrument 22 with the tip of the standard tool 23 attached to the machine tool 2. The movement control unit 12 moves the tip of the standard tool 23 to the tool detection position P. The movement control unit 12 moves the tip of the standard tool 23 in a direction away from the state in which the pressed surface U of the measuring instrument 22 is pressed down.

The detection unit 13 is implemented, for example, by the CPU operating. The detection unit 13 detects a signal indicating the tool detection position P, output by the pressing down of the measuring instrument 22. The detection unit 13 detects, for example, the output, from the measuring instrument 22, of a signal indicating that the tool detection position P has been reached, by further movement of the tip of the standard tool 23 in contact with the pressed surface U of a switch S. In the present embodiment, the detection unit 13 detects a detection signal indicating that the tip of the standard tool 23 exists within a tool detectable range R including the tool detection position P. In the present embodiment, the measuring instrument 22 is configured to be able to turn on a lamp 24 (see FIG. 3A) disposed on a side surface of the housing of the measuring instrument 22 during detecting contact with the standard tool 23.

The identification unit 14 is implemented, for example, by the CPU operating. The identification unit 14 identifies the tool detection position P of the measuring instrument 22 based on the position of the tip of the standard tool 23 at the timing when the detection signal is detected. In the present embodiment, the identification unit 14 identifies, as the tool detection position P, a position to which the pressed surface U of the measuring instrument 22 is pressed down by a predetermined distance. The identification unit 14 identifies, for example, the height of (distance to) the tool detection position P based on the position obtained from the attachment position of the standard tool 23 and the known length of the standard tool 23 at the timing when the detection signal is detected.

Figure 3A:
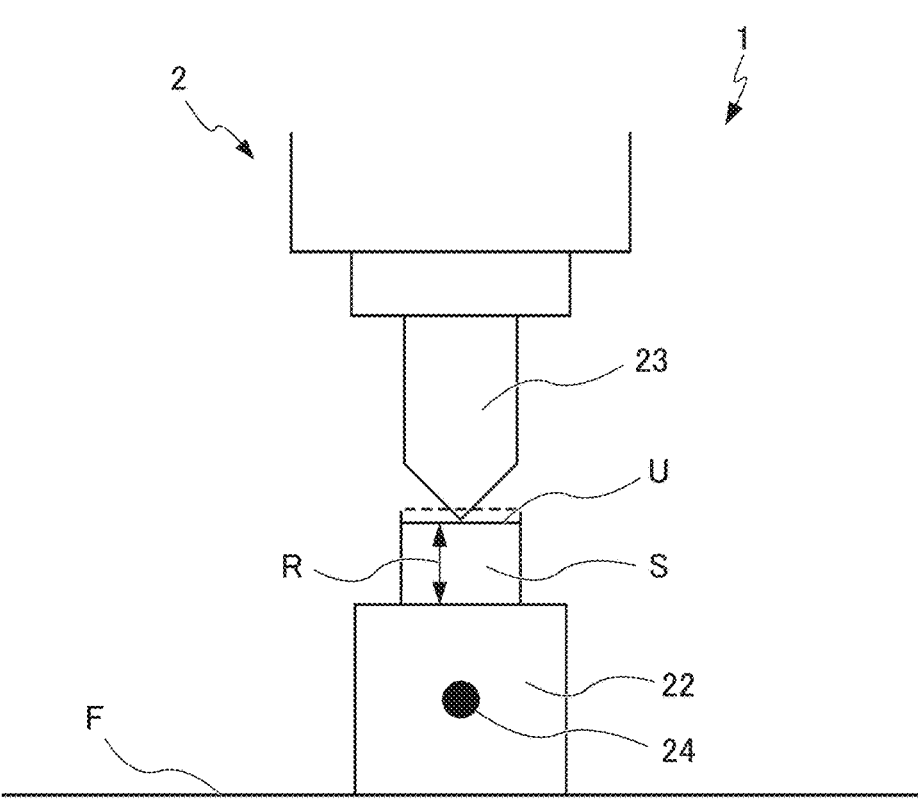
FIG. 3A shows a positional relationship between a tool of the machine tool and a measuring instrument in the measuring device of the embodiment.
Figure 3B:
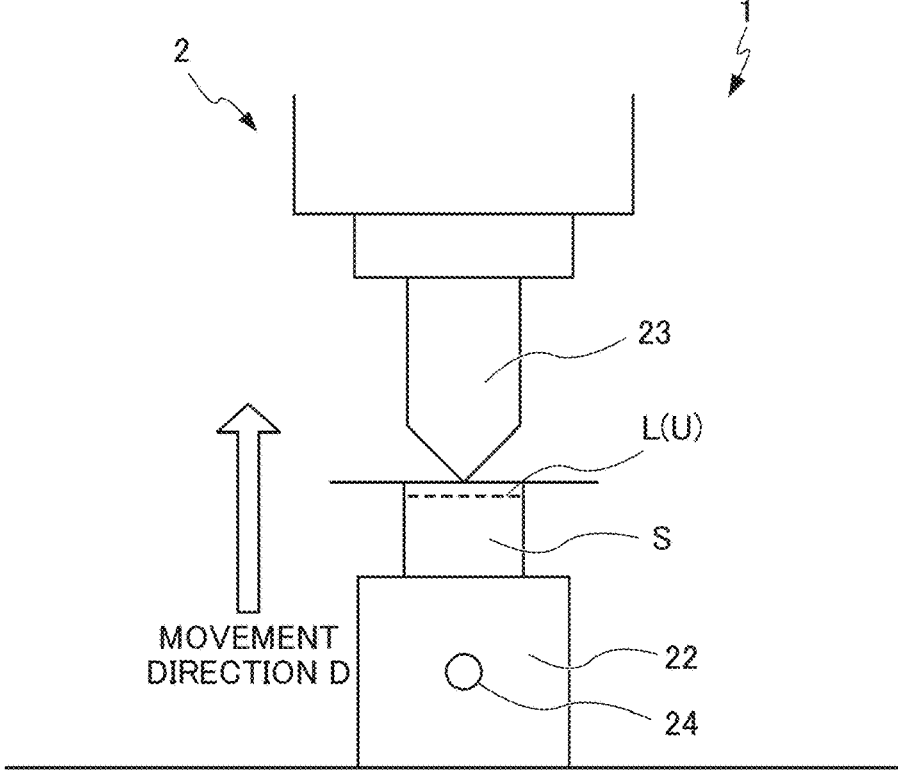
FIG. 3B shows a positional relationship between the tool of the machine tool and the measuring instrument in the measuring device of the embodiment.

Next, the operation flow of the measuring device 1 will be described with reference to FIG. 3A to FIG. 4. First, the speed acquisition unit 11 acquires a preset feed speed (Step S1). Next, the tip of the standard tool 23 is disposed at a position where it presses down the pressed surface U of the measuring instrument 22 (Step S2). Specifically, as shown in FIG. 3A, the tip of the standard tool 23 is disposed at a position where the detection signal indicating that the tip of the standard tool 23 exists within the tool detectable range R including the tool detection position P, is detected. In the present embodiment, the detection unit 13 detects the detection signal caused by the standard tool 23 that is manually moved into the tool detectable range R. Here, the tool detectable range R refers to a range in which the measuring instrument 22 outputs the detection signal with respect to contact with the tip of the standard tool 23. The range is from a start position at which the pressed surface U of the switch S is pressed down by the standard tool 23 the detection signal can start to be output if the pressed surface U of the switch S is pressed down by the standard tool 23, to an end position, closer to the measuring instrument 22 than the start position (for example, typically lower), at which the standard tool 23 can still press down the pressed surface U of the switch S and the detection signal can be still output.

Next, the movement control unit 12 moves (typically raises) the standard tool 23 in a direction away from the measuring instrument 22, from the state in which the detection signal is detected by the detection unit 13 (Step S3). Next, the detection unit 13 detects the timing of switching to a state in which the detection signal is not detected by the detection unit 13 in the movement of the standard tool 23 in the direction away from the measuring instrument 22 (Step S4). The detection unit 13 detects, for example, the timing when an ON state in which the switch S detects the contact with the tip of the standard tool 23 is changed to a state in which the contact with the tip of the standard tool 23 cannot be detected. As shown in FIG. 3B, the identification unit 14 identifies the position of the tip of the standard tool 23 at the timing of switching as a first detection limit position L (typically, the upper limit position).

Figure 3C:
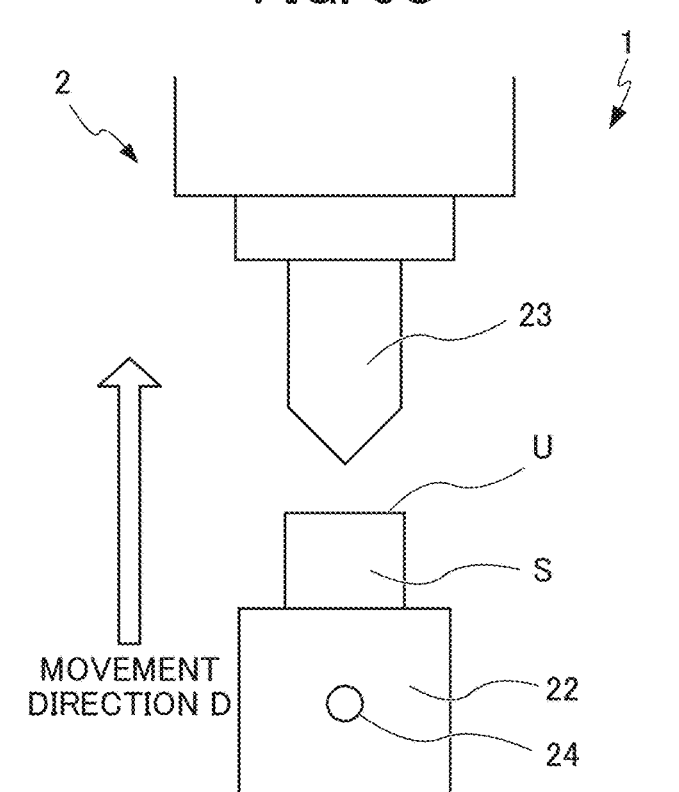
FIG. 3C shows a positional relationship between the tool of the machine tool and the measuring instrument in the measuring device of the embodiment.
Figure 3D:
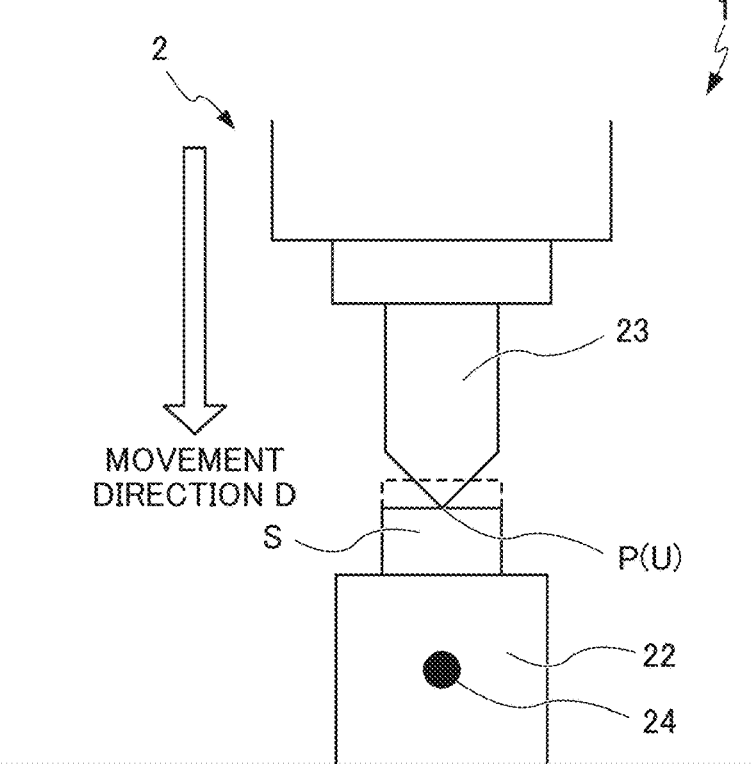
FIG. 3D shows a positional relationship between the tool of the machine tool and the measuring instrument in the measuring device of the embodiment.
Figure 4:
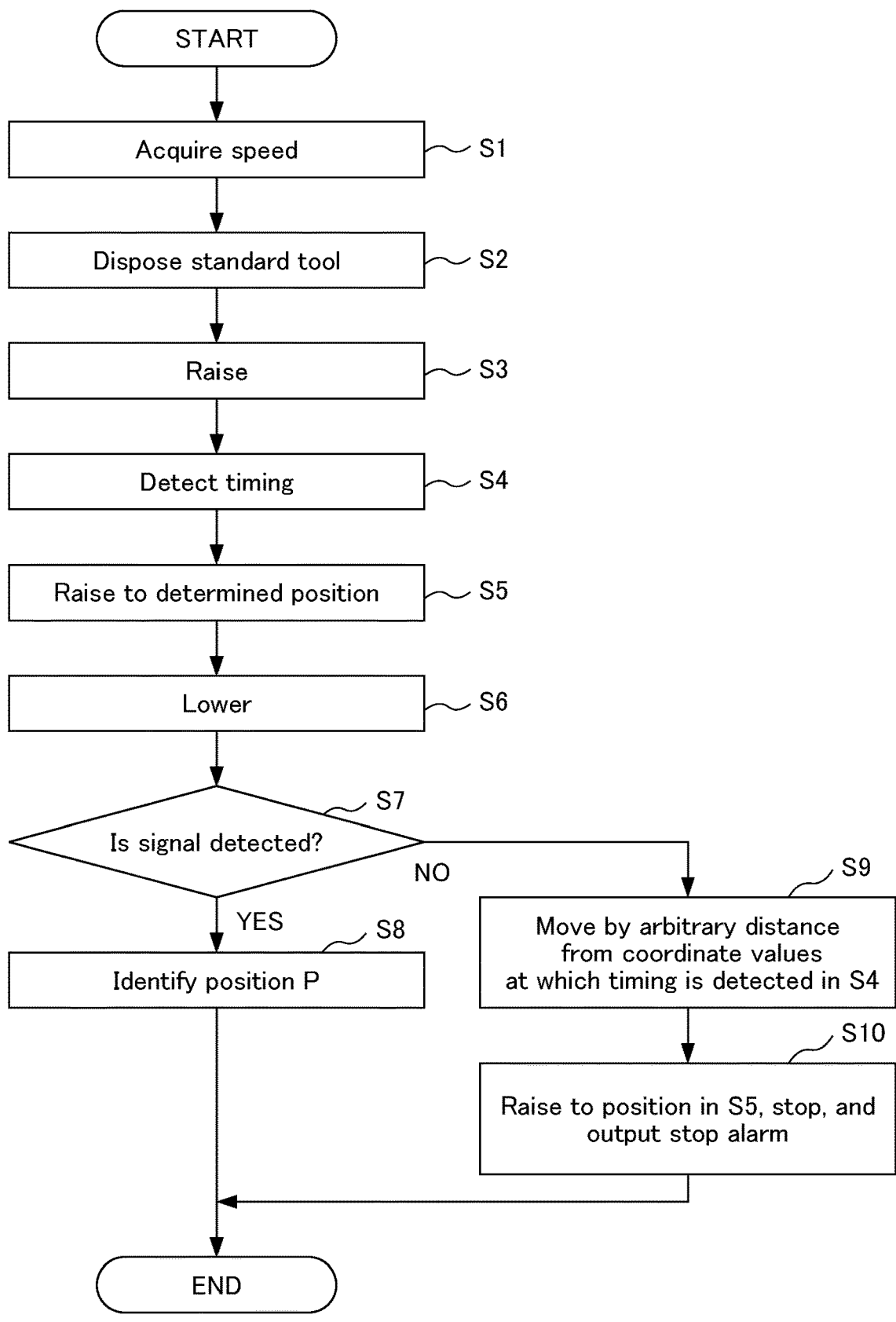
FIG. 4 is a flowchart showing an operation flow of the measuring device of the embodiment.

Next, as shown in FIG. 3C, the movement control unit 12 continues to move the standard tool 23 in the direction away from the measuring instrument 22, so that the detection signal is not detected by the detection unit 13. The movement control unit 12 moves the standard tool 23 to an arbitrarily determined position (Step S5). Next, the movement control unit 12 moves (typically lowers) the standard tool 23 toward the measuring instrument 22. Specifically, as shown in FIG. 3D, the movement control unit 12 moves the tip of the standard tool 23 toward the measuring instrument 22 at the feed speed acquired by the speed acquisition unit 11 (Step S6).

Next, it is determined whether the detection unit 13 detects the detection signal again (Step S7). In a case where the detection signal is detected (Step S7: YES), the processing advances to Step S8. On the other hand, in a case where the detection signal is not detected (Step S7: NO), the processing advances to Step S9.

In Step S8, the identification unit 14 identifies the tool detection position P based on the position of the standard tool 23 at a timing when the detection signal is detected again. Specifically, the identification unit 14 identifies the tool detection position P based on the position of the tip of the standard tool 23 at the timing when the detection signal is detected again. Thus, the processing of this flow ends.

In Step S9 (Step S7: NO), the movement control unit 12 moves the standard tool 23 by an arbitrary distance, from the coordinate values at which the timing is detected in Step S4 toward the measuring instrument 22 (in the −Z direction). In a case where the detection signal is still not detected, the movement control unit 12 raises the standard tool 23 to the position of Step S5 and then stops the standard tool 23, and outputs a stop alarm (Step S10). Thus, the processing of this flow ends.

Next, the program of the present disclosure will be described. Each of the features included in the measuring device 1 can be implemented by hardware, software, or a combination thereof. Here, "implemented by software" means that it is implemented by a computer reading and executing a program.

The program may be stored and provided to the computer using various types of non-transitory computer readable media. The non-transitory computer readable media include various types of tangible storage media. Examples of the non-transitory computer readable media include magnetic recording media (e.g., flexible disks, magnetic tapes, hard disk drives), magneto-optical recording media (e.g., magneto-optical disks), CD-ROMs (read only memories), CD-Rs, CD-R/Ws, and semiconductor memories (e.g., mask ROMs, PROMs (programmable ROMs), EPROMs (erasable PROMs), flash ROMs, and RAMs (random access memories)). The program may also be provided to the computer by various types of transitory computer readable media. Examples of the transitory computer readable media include electrical signals, optical signals, and electromagnetic waves. The transitory computer readable media can provide the program to the computer via wired communication paths such as electric wires and optical fibers, or wireless communication paths.

As described above, according to the measuring device 1 and the program of the embodiment, the following effects are achieved.

(1) A measuring device 1 for measuring, with respect to a measuring instrument 22 for measuring a length of a cutting tool 21 attached to a machine tool 2, a distance from a reference position of the machine tool 2 to a tool detection position P of the measuring instrument 22. The measuring device includes a movement control unit 12 configured to control movement of a standard tool having a known length attached to the machine tool 2, a detection unit 13 configured to detect a detection signal indicating the tool detection position P, output by pressing down of the measuring instrument 22, and an identification unit 14 configured to identify the tool detection position P of the measuring instrument 22 based on a position of a tip of the standard tool 23 at a timing when the detection signal is detected. The detection unit 13 is configured to detect a detection signal indicating that the tip of the standard tool 23 exists within a tool detectable range R including the tool detection position P. The movement control unit 12 is configured to move the standard tool 23 in a direction away from the measuring instrument 22 to change a state in which the detection signal is detected by the detection unit 13 to a state in which the detection signal is not detected by the detection unit 13, and then move the standard tool 23 toward the measuring instrument 22 to change to a state in which the detection signal is detected again by the detection unit 13. The identification unit 14 is configured to identify the tool detection position P based on a position of the standard tool 23 at a timing when the detection signal is detected again.

This allows the tool detection position P to be identified while switching from the state in which the detection signal is detected to the state in which the detection signal is not detected. Therefore, it is possible to verify whether the measuring instrument 22 appropriately operates in the measurement.

(2) The detection unit 13 is configured to detect a timing of switching to a state in which the detection signal is not detected by the detection unit 13 in the movement of the standard tool 23 in the direction away from the measuring instrument 22. The identification unit 14 is configured to identify, as a first detection limit position L, a position of the tip of the standard tool 23 at the timing of switching. The movement control unit 12, when the standard tool is moved toward the measuring instrument 22, is configured to restrict the tip of the standard tool 23 from moving beyond the first detection limit position L and by a first predetermined distance or more. Thus, when the detection signal cannot be detected due to a contact failure of the measuring instrument 22 or the like, it is possible to restrict the tip of the standard tool 23 from moving by the first predetermined distance or more. Therefore, the measuring instrument 22 and the standard tool 23 can be protected.

(3) The measuring device 1 further includes a speed acquisition unit 11 configured to acquire a preset feed speed at which the cutting tool 21 is moved toward the measuring instrument 22 when the length of the cutting tool 21 is measured. The movement control unit 12 is configured to move the standard tool 23 toward the measuring instrument 22 at the feed speed acquired by the speed acquisition unit 11. This allows the tool detection position P to be identified using the feed speed at which the tool length of the cutting tool 21 is measured. Therefore, in the contact-type measuring instrument 22, since the deviation of the output timing of the detection signal due to the difference in feed speed can be taken into account, the accuracy of measuring the tool length of the cutting tool 21 can be improved.

Although preferred embodiments of the measuring device and the program of the present disclosure have been described above, the present disclosure is not limited to the above-described embodiments, and can be modified as appropriate. For example, in the above embodiments, the measuring device 1 may be configured as a part of a calibration device for calibrating the coordinates of the tool detection position P of the measuring instrument 22. Thus, when actually measuring the tool length of the cutting tool 21, it is possible to improve the accuracy of measuring the tool length.

Furthermore, in the above embodiment, the identification unit 14 may stop identifying the tool detection position P while the standard tool 23 is moved in the direction away from the measuring instrument 22, if the state in which the detection signal is not detected with respect to a movement of a second predetermined distance or more doesn't come. For example, the identification unit 14 may stop identifying the tool detection position P when the detection signal is not turned off even if the tip of the standard tool 23 moves beyond the first detection limit position L and by the second predetermined distance or more. Here, the second predetermined distance is preferably, for example, greater than the length of the tool detectable range R. This allows detection of malfunctions of the measuring instrument 22, such as the switch S of the measuring instrument 22 sticking and not moving mechanically.

EXPLANATION OF REFERENCE NUMERALS

1 measuring device
2 machine tool
11 speed acquisition unit
12 movement control unit
13 detection unit
14 identification unit
21 cutting tool
23 standard tool
22 measuring instrument
32 table
F reference position
L first detection limit position
P tool detection position
Q predetermined position
R tool detectable range
S switch
U pressed surface

The invention claimed is:
1. A measuring device for measuring, with respect to a measuring instrument for measuring a length of a cutting tool attached to a machine tool, a distance from a reference position of the machine tool to a tool detection position of the measuring instrument, the measuring device comprising:
a movement control unit configured to control movement of a standard tool having a known length attached to the machine tool;
a detection unit configured to detect a detection signal indicating the tool detection position, output by pressing down of the measuring instrument; and
an identification unit configured to identify the tool detection position of the measuring instrument based on a position of a tip of the standard tool at a timing when the detection signal is detected,
the detection unit being configured to detect the detection signal indicating that the tip of the standard tool exists within a tool detectable range including the tool detection position,
the movement control unit being configured to move the standard tool in a direction away from the measuring instrument to change a state in which the detection signal is detected by the detection unit to a state in which the detection signal is not detected by the detection unit, and then move the standard tool toward the measuring instrument to change to a state in which the detection signal is detected again by the detection unit, and
the identification unit being configured to identify the tool detection position based on a position of the standard tool at a timing when the detection signal is detected again, wherein the detection unit is configured to detect a timing of switching to a state in which the detection signal is not detected by the detection unit in the movement of the standard tool in the direction away from the measuring instrument, the identification unit is configured to identify, as a first detection limit position, a position of the tip of the standard tool at the timing of switching, and the movement control unit, when the standard tool is moved toward the measuring instrument, is configured to restrict the tip of the standard tool from moving beyond the first detection limit position and by a first predetermined distance or more.

2. The measuring device according to claim 1, further comprising a speed acquisition unit configured to acquire a preset feed speed at which the cutting tool is moved toward the measuring instrument when the length of the cutting tool is measured, wherein the movement control unit is configured to move the standard tool toward the measuring instrument at the feed speed acquired by the speed acquisition unit.

3. The measuring device according to claim 1, wherein the detection unit is configured to detect the detection signal caused by the standard tool that is manually moved into the tool detectable range.

4. The measuring device according to claim 1, wherein the identification unit is configured to stop identifying the tool detection position while the standard tool is moved in the direction away from the measuring instrument, if the state in which the detection signal is not detected with respect to a movement of a second predetermined distance or more doesn't come.

5. A non-transitory computer readable media which non-transitorily stores a program causing a computer to function as a measuring device for measuring, with respect to a measuring instrument for measuring a length of a cutting tool attached to a machine tool, a distance from a reference position of the machine tool to a tool detection position of the measuring instrument, the program causing the computer to function as:

a movement control unit configured to control movement of a standard tool having a known length attached to the machine tool;

a detection unit configured to detect a detection signal indicating the tool detection position, output by pressing down of the measuring instrument; and an identification unit configured to identify the tool detection position of the measuring instrument based on a position of a tip of the standard tool at a timing when the detection signal is detected, the detection unit being configured to detect the detection signal indicating that the tip of the standard tool exists within a tool detectable range including the tool detection position, the movement control unit being configured to move the standard tool in a direction away from the measuring instrument to change a state in which the detection signal is detected by the detection unit to a state in which the detection signal is not detected by the detection unit, and then move the standard tool toward the measuring instrument to change to a state in which the detection signal is detected again by the detection unit, and the identification unit being configured to identify the tool detection position based on a position of the standard tool at a timing when the detection signal is detected again, wherein the detection unit is configured to detect a timing of switching to a state in which the detection signal is not detected by the detection unit in the movement of the standard tool in the direction away from the measuring instrument, the identification unit is configured to identify, as a first detection limit position, a position of the tip of the standard tool at the timing of switching, and the movement control unit, when the standard tool is moved toward the measuring instrument, is configured to restrict the tip of the standard tool from moving beyond the first detection limit position and by a first predetermined distance or more.

* * * * *